US011117633B2

(12) United States Patent
Todd et al.

(10) Patent No.: US 11,117,633 B2
(45) Date of Patent: Sep. 14, 2021

(54) ADJUSTABLE BACKREST/HEADREST SYSTEM (71) Applicants: Mark Todd, Jacksonville, FL (US); Kevin Christensen, Jacksonville, FL (US)

(72) Inventors: Mark Todd, Jacksonville, FL (US); Kevin Christensen, Jacksonville, FL (US)

( * ) Notice: Subject to any disclaimer, the term of this patent is extended or adjusted under 35 U.S.C. 154(b) by 0 days.

(21) Appl. No.: 14/334,593

(22) Filed: Jul. 17, 2014

(65) Prior Publication Data
US 2020/0138194 A1 May 7, 2020

(51) Int. Cl.
| B62J 1/28 | (2006.01) |
| A47C 7/38 | (2006.01) |
| A47C 7/40 | (2006.01) |
| B62J 1/00 | (2006.01) |

(52) U.S. Cl.
CPC .............. *B62J 1/28* (2013.01); *A47C 7/38* (2013.01); *A47C 7/402* (2013.01); *B62J 1/007* (2013.01)

(58) Field of Classification Search
CPC .. A47C 7/402; A47C 7/38; B62J 1/007; B62J 1/28
See application file for complete search history.

(56) References Cited

U.S. PATENT DOCUMENTS

| 526,071 | A | * | 9/1894 | Cushing | A47C 7/506 |
| | | | | | 297/423.25 |
| 1,685,599 | A | * | 9/1928 | Fletcher | A61G 15/002 |
| | | | | | 297/25 |
| 2,282,109 | A | * | 5/1942 | Angell | A47C 1/143 |
| | | | | | 297/19 |
| 2,558,143 | A | * | 6/1951 | Lauterbach | A61G 15/02 |
| | | | | | 297/69 |
| 2,702,072 | A | * | 2/1955 | Schuessler | A61G 15/002 |
| | | | | | 297/29 |
| 3,822,917 | A | * | 7/1974 | George | B62J 1/28 |
| | | | | | 297/215.12 |
| 4,313,639 | A | * | 2/1982 | Ware | B60N 2/22 |
| | | | | | 297/215.12 |
| 5,427,436 | A | * | 6/1995 | Lloyd | A47C 7/38 |
| | | | | | 297/408 |
| 6,206,399 | B1 | * | 3/2001 | Schnitzenbaumer | B62J 1/28 |
| | | | | | 280/304.4 |
| 6,983,992 | B2 | * | 1/2006 | Oomori | B62J 1/12 |
| | | | | | 297/352 |
| 7,549,704 | B1 | * | 6/2009 | Chou | A47C 7/38 |
| | | | | | 297/408 |
| 7,604,292 | B1 | * | 10/2009 | Reading | B62J 1/12 |
| | | | | | 297/215.11 |
| 8,371,652 | B2 | * | 2/2013 | Revell | B62J 7/08 |
| | | | | | 297/352 |

(Continued)

*Primary Examiner* — Philip F Gabler
(74) *Attorney, Agent, or Firm* — Steven R. Scott (57) ABSTRACT

This adjustment mechanism/assembly for a backrest/headrest includes a series of parts connected by a threaded rod with a knob on each end. The parts are arranged such that they sandwich two support members so that when the knobs are loosened the unit can easily slide up and down, changing the elevation of the backrest/headrest pad unit with respect to a seat bottom or seat back. Further, when the knobs are loose the upper member and its attached pad can be pivoted fore and aft and slide back and forth. Tightening the two knobs locks the entire unit in place.

18 Claims, 6 Drawing Sheets

(56) References Cited

U.S. PATENT DOCUMENTS

| | | | | |
|---|---|---|---|---|
| 8,662,591 B2* | 3/2014 | Lin | ............................ | A47C 7/38 |
| | | | | 297/391 |
| 8,905,474 B2* | 12/2014 | Parvey | ........................ | B62J 1/28 |
| | | | | 297/215.13 |
| 10,597,102 B2* | 3/2020 | Cheng | .......................... | B62J 7/04 |
| 2008/0084097 A1* | 4/2008 | Botting | ........................ | B62J 1/28 |
| | | | | 297/215.12 |

* cited by examiner

ADJUSTABLE BACKREST/HEADREST SYSTEM

CROSS REFERENCE TO RELATED APPLICATIONS

This application claims an invention which was disclosed in a provisional application filed Jul. 17, 2013, Ser. No. 61/847,540, entitled "Adjustable Backrest/Headrest System". The benefit under 35 USC § 119(e) of this United States provisional application is hereby claimed, and the aforementioned application is hereby incorporated herein by reference.

BACKGROUND OF THE INVENTION

This invention pertains generally to adjustable headrests and backrests. More particularly, the invention pertains to a headrest/backrest mechanism offering a broad range of motion via simple and convenient dual hand-turned knobs. A variety of adjustable headrests and backrests are extant in prior art. However, there is a continuing need for devices providing new and improved features in the field of the invention. Further, there are no prior art devices possessing the unique features and advantages inherent in our invention.

SUMMARY OF THE INVENTION

The instant invention teaches an adjustment mechanism that includes a series of parts connected by a threaded rod with a knob on each end. The parts are arranged such that they sandwich two support members so that when the knobs are loosened the unit can easily slide up and down, changing the elevation of the backrest/headrest pad unit. Further, when the knobs are loose the upper member and its attached pad can be pivoted fore and aft. Tightening the two knobs locks the entire unit in place. It also provides numerous other advantages, which will be more fully understood after review of the drawings and detailed description that follows.

DESCRIPTION

Figure 1:
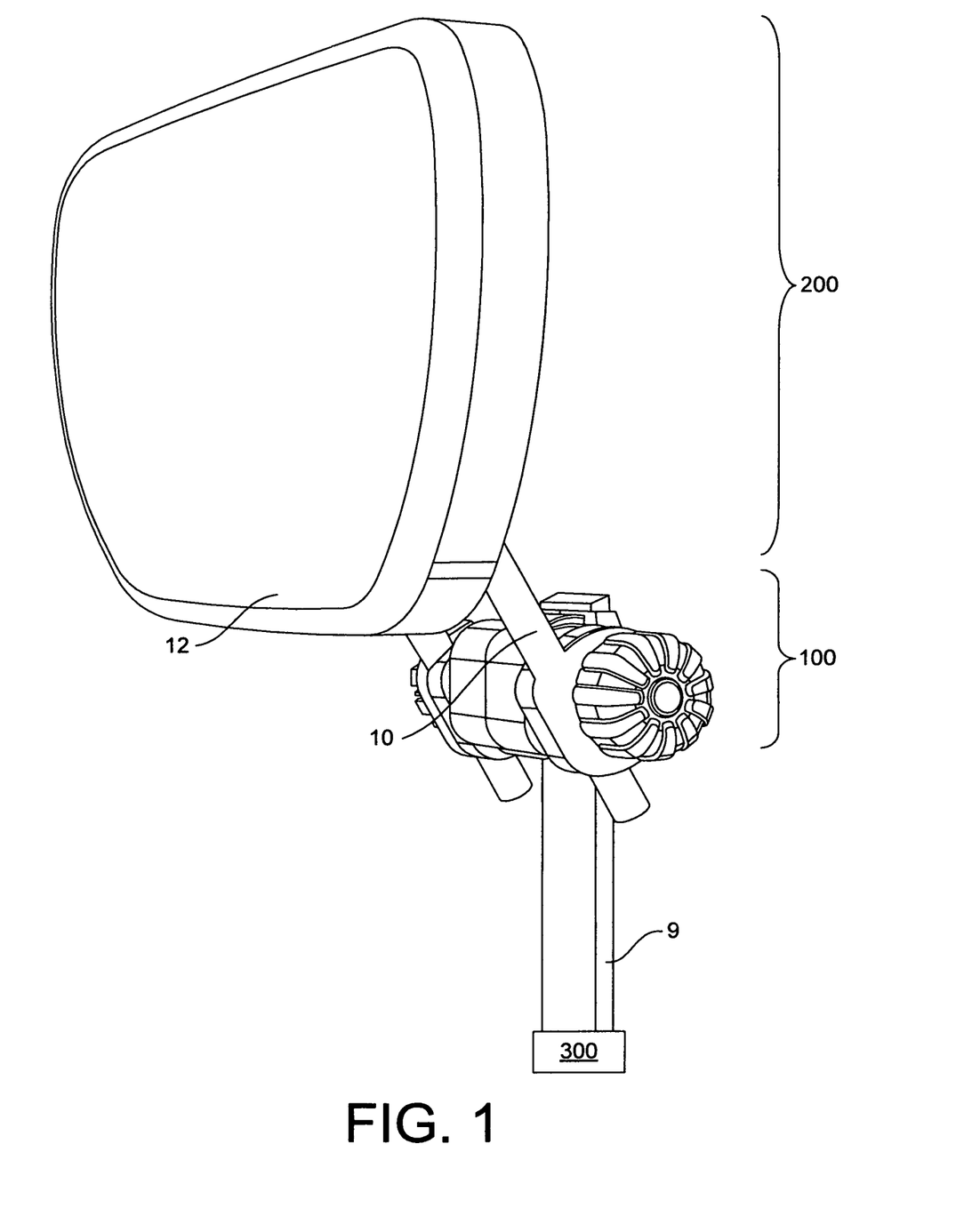
FIG. 1 provides a front schematic perspective view of the back/head rest of the invention.
Figure 2:
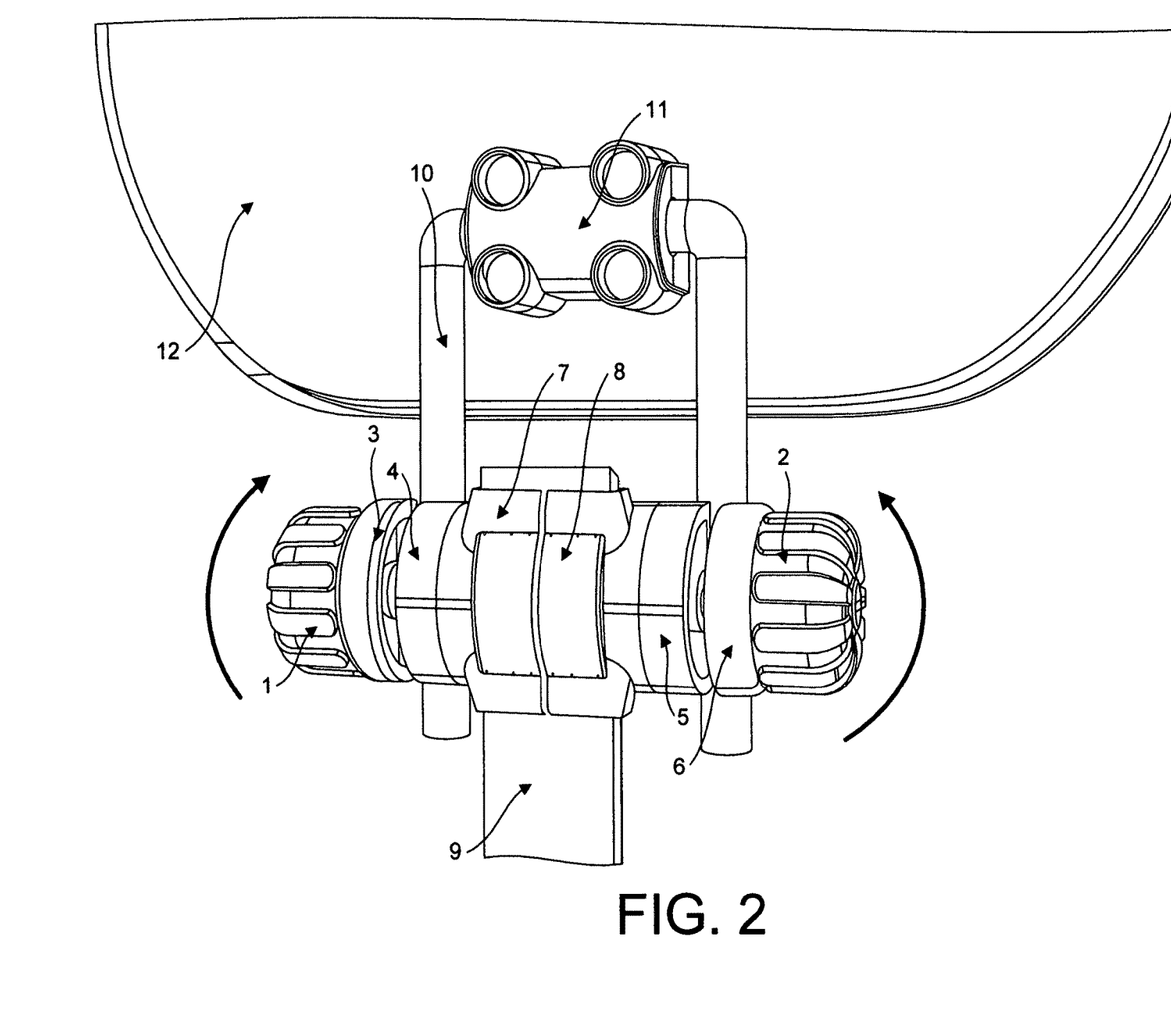
FIG. 2 provides a back schematic perspective view of the back/head rest of the invention focusing on and illustrating the features and mechanism thereof.
Figure 3:
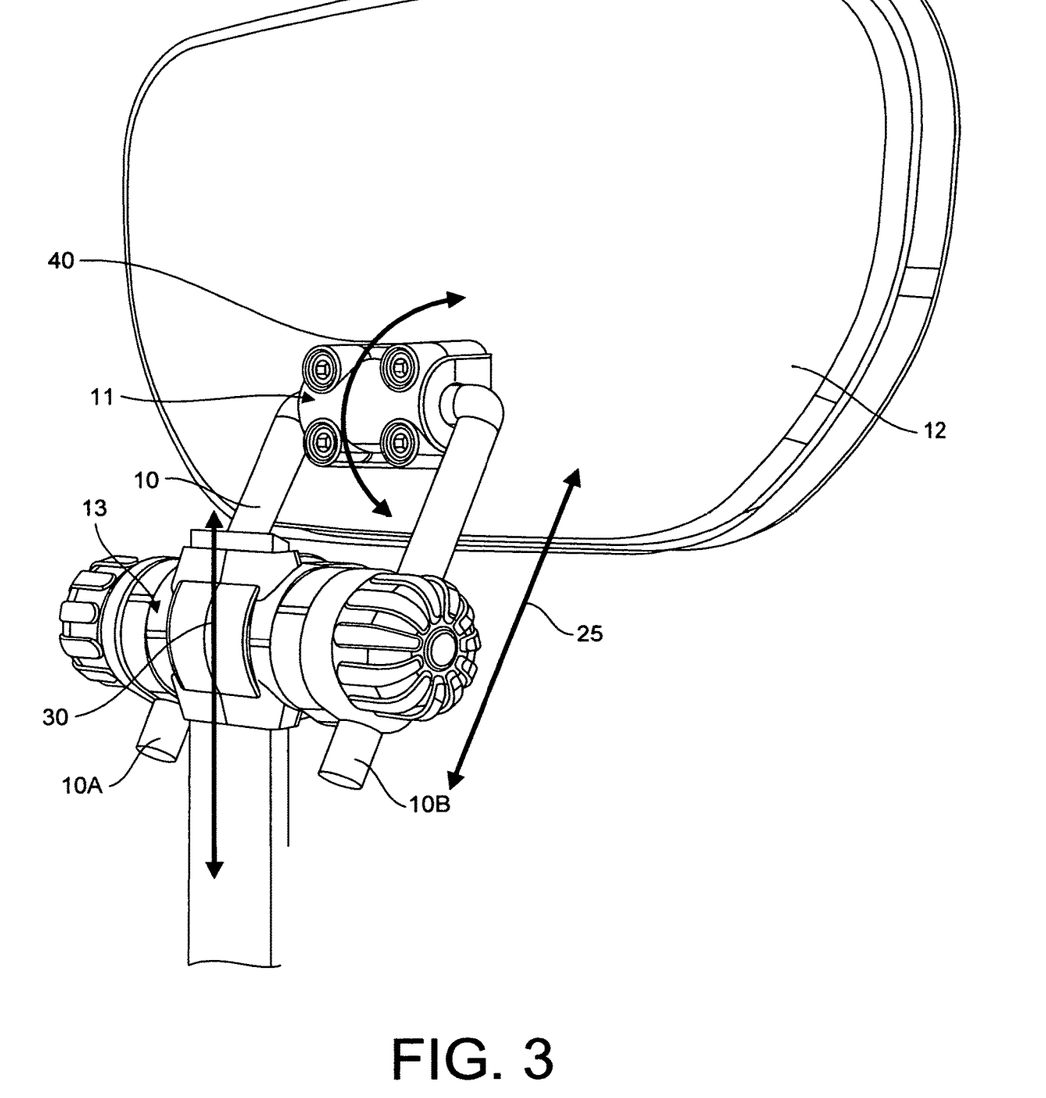
FIG. 3 provides a back schematic perspective view of the back/head rest of the invention focusing on and illustrating certain sliding and rotating adjustment features thereof.

Turning first to FIG. 1, it will be seen that the instant invention is characterized by an adjustable juncture 100 that is intermediate a backrest/headrest 200 (illustrated generally as "pad" 12) and a lower support 300 (represented schematically) which may be a seat bottom (if pad 12 is a backrest) or a seat back (if pad 12 is a headrest). As further illustrated in FIGS. 2 through 4, juncture 100 is comprised of numerous parts (numbered 1-8 and discussed further below), and interfaces with and is joined to (i) a lower connecting member 9 (by which it is connected to lower support 300), and (ii) to pad 12 via an upper connecting member 10 (by which it is connected to pad 12 via a mount 11). As will be further noted, these parts may advantageously be formed using a "U-rod" as shown for upper connecting member 10 and a bar member as shown for lower connecting member 9.

Figure 4:
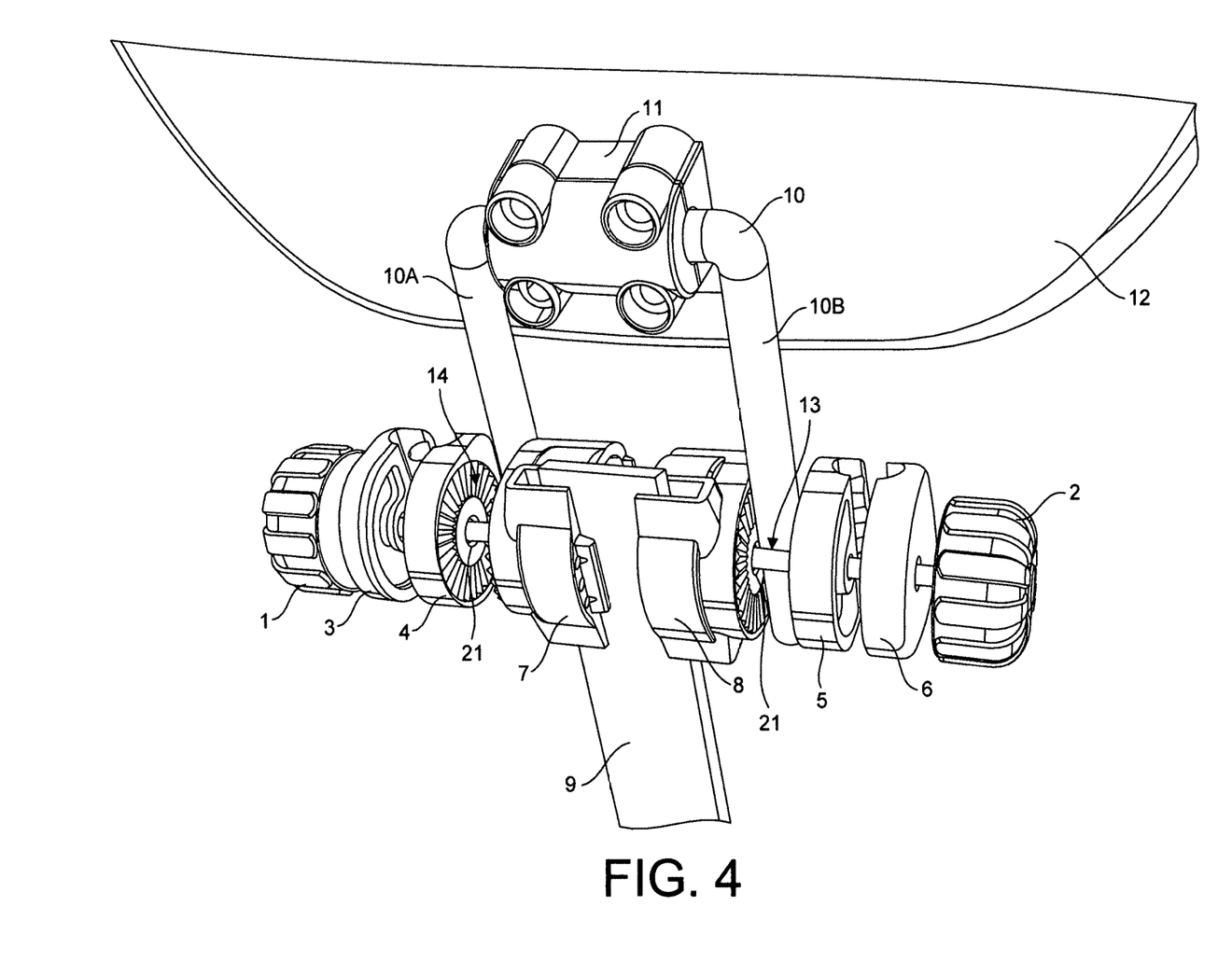
FIG. 4 provides a back schematic perspective view of the back/head rest of the invention focusing on and illustrating the mechanism thereof in exploded perspective.
Figure 5:
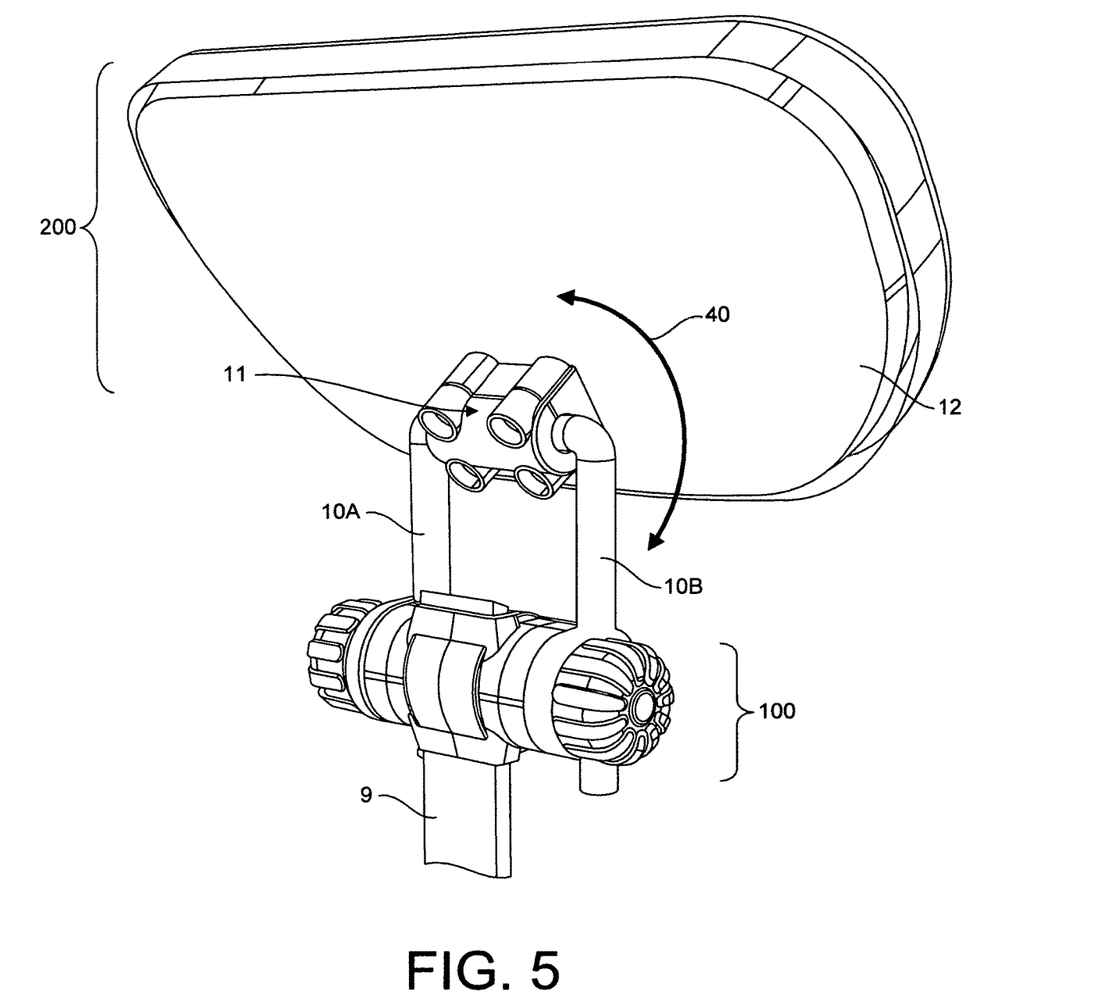
FIG. 5 provides a back schematic perspective view of the back/head rest of the invention focusing on and illustrating a rotation mechanism thereof.
Figure 6:
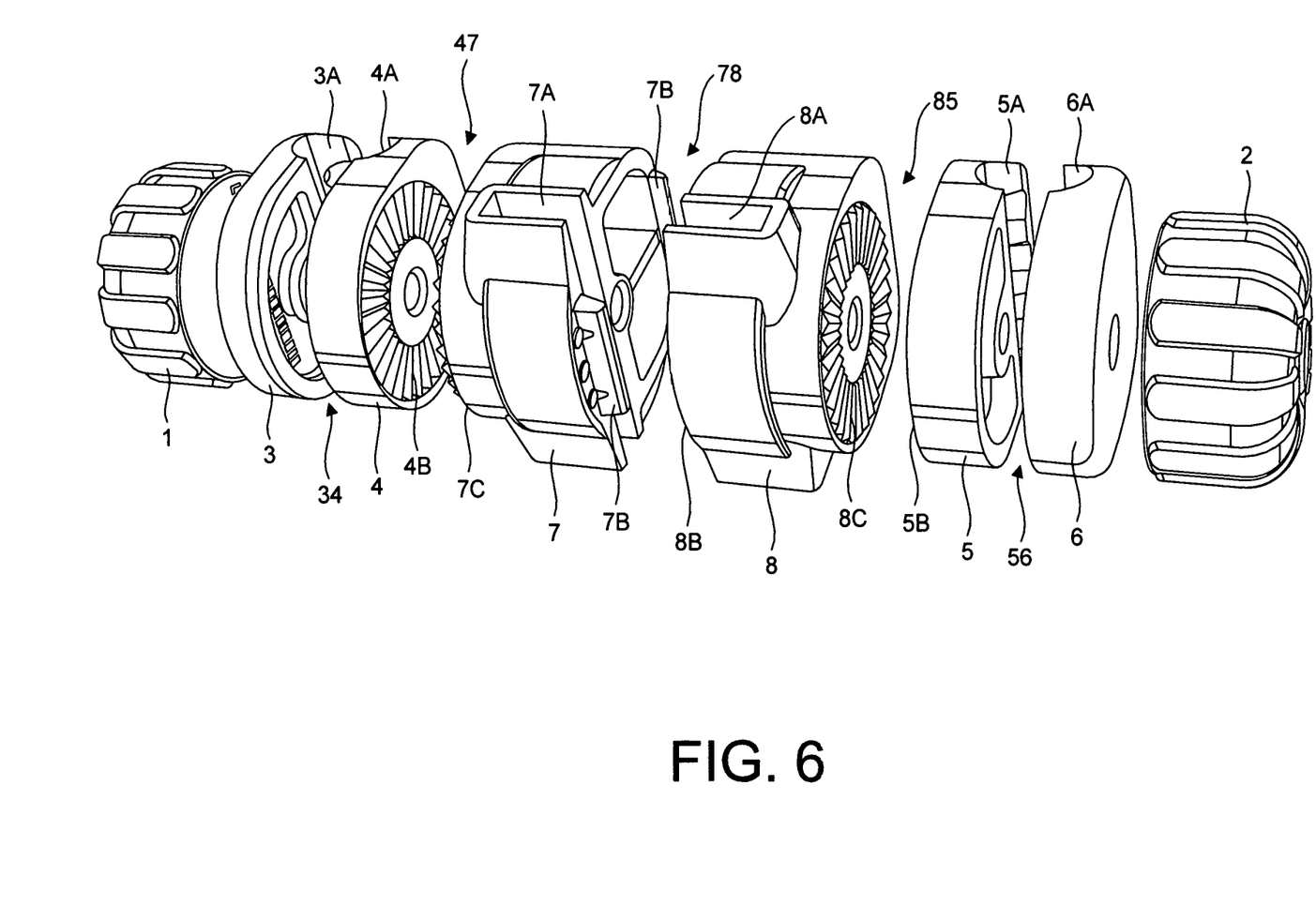
FIG. 6 provides an exploded schematic perspective view of the primary parts of the mechanism of the invention.

Focusing now on FIGS. 2 through 6, and particularly on FIGS. 4 and 6, it will be noted that juncture 100 can advantageously be formed from eight parts (denoted 1 through 8 in the drawing figures) penetrated and held together by a central connecting rod 13, which runs through central apertures 21, in each of the parts 3 through 6 located between the two end knobs 1 and 2. (Central apertures 21 are denoted only as to parts 4 and 8 in FIG. 4 to avoid overcrowding of the drawing figures). End knobs 1 and 2 act as tightening members for juncture 100 and its component parts such that rotation of said knobs 1, 2 in one way will act to squeeze the parts 3 through 8 that are intermediate knobs 1 and 2 together so that they are locked in position, and the opposite will loosen said parts. To accomplish this purpose, knobs 1 and 2 can interface with rod 13 in various ways well known in the mechanical arts, such as by (for example) anchoring one end of rod 13 in one of said end knobs 1, 2 and providing a threading interface between rod 13 and the other of said end knobs 1, 2. Loosening the connection between the parts comprising juncture 100 in the manner described in this paragraph allows three possible adjustments, which are discussed in turn below.

First, it loosens the connections between the paired components that grip and frictionally hold the two arms 10A and 10B of U-Rod 10 in place in juncture 100. These are outer rod gripping members 3 and 6 which connect (respectively) with inner rod gripping members 4 and 5 to firmly frictionally hold the arms 10A, 10B or U-Rod 10 and the pad 12 connected thereto in fixed position relative to junction 100 at interfaces 34 and 56. Likewise, when loosened, they allow sliding motion towards/away from junction 100 as illustrated by "movement" arrows 25 in FIG. 3. As will further be noted, rod gripping members 3, 4, 5, and 6 are furnished with interfacing semi-cylindrical rod gripping portions 3A, 4A. 5A, and 6A, to fit firmly around and grip cylindrical arms 10A, 10B firmly when the assembly is tightened. Finally, it should be noted that rod gripping member 4 and 5 have the same structure as do rod gripping members 3 and 6. Thus, the same parts can be flipped to a different orientation to play the part of rod gripping members 4 and 5. Likewise, the same part can serve as rod gripping members 3 and 6. This results in lower design and manufacturing costs.

Second, it loosens the connections between the paired components that grip and frictionally hold lower connecting member 9 in place in juncture 100 at interface 78. These are connecting member gripping elements 7 and 8 which connect to firmly frictionally hold juncture 100 in fixed position relative to lower connecting member 9. Likewise, when loosened, they allow sliding motion of juncture 100 and the pad 12 connected thereto towards/away from lower body support 300 as illustrated by "movement" arrows 30 in FIG. 3. As will further be noted, connecting element gripping elements 7 and 8 are furnished with interfacing bar gripping portions 7A and 8A having rectangular cross-sections matching connecting member 9, to fit firmly around and grip connecting member 9 firmly when the assembly is tightened. Finally, it should be noted that gripping elements 7 and 8 have essentially the same structure and could be flipped for usage, except that element 7 is provided with tabs 7B that interface with slots 8B in element 8 for a firmer juncture when joined together tightly. As with the parts previously discussed, the similarity in these parts results in lower design and manufacturing costs.

Third, it loosens the connections between the paired components that grip and hold the two arms 10A and 10B of U-Rod 10 (and the pad 12 connected thereto) at a particular angle with respect to juncture 100 and lower connecting member 9. These are inner rod gripping members 4 and 5 which interface (respectively) with connecting member gripping elements 7 (at interface 47) and 8 (at interface 85) to firmly hold U-Rod 10 and the pad 12 connected thereto in fixed angular position relative to junction 100 and lower connecting member 9. Likewise, when loosened, they allow rotational motion around the axis formed by rod 13 of junction 100 to different angles such as those shown in FIG. 2 and FIG. 3.

In order to facilitate the locking of the aforesaid components in a fixed angular position at interface 47, member 4 and element 7 are provided with facing (and interfacing) rotational interference structures 4B and 7C in the form of matching radially symmetrically arranged V-shaped teeth that, when squeezed together when the structure is tightened, prevent rotational movements of member 4 with respect to element 7 and thereby prevent change in the angle discussed above. The same is true of the interference structures 5B, 8C of (and interface 85 between) member 5 and element 8. A variety of interference structures known in the mechanical arts could be used for this purpose so long as they are radially symmetrically arranged around the axis provided by rod 13 (and apertures 21). Such structures need not be identical as in the preferred embodiment, so long as they will mesh and lock at different angular/rotational positions in the same manner as the structures used in the preferred embodiment illustrated and discussed.

Finally, pad mount 11 may be free rotating (as illustrated by movement arrows 40) or locking depending on use requirements. Thus, as in this case and in view of the foregoing, it should be clear that numerous changes and variations can be made without exceeding the scope of the inventive concept outlined. Accordingly, it is to be understood that the embodiment(s) of the invention herein described is/are merely illustrative of the application of the principles of the invention. Reference herein to details of the illustrated embodiment(s) is not intended to limit the scope of the claims, which themselves recite those features regarded as essential to the invention.

PARTS LIST

1 Hand knob
2 Hand knob
3 Outer rod gripping member
3A Rod gripping portion of part 3
4 Inner rod gripping member
4A Rod gripping portion of part 4
4B Interference structure on part 4
5 Inner rod gripping member
5A Rod gripping portion of part 5
5B Interference structure on part 5
6 Outer rod gripping member
6A Rod gripping portion of part 6
7 Connecting member gripping element
7A Bar gripping portion of part 7
7B Tabs in part 7 that interface with slots in part 8
7C Interference structure on part 7
8 Connecting member gripping element
8A Bar gripping portion of part 8
8B Slots in part 8 that interface with tabs in part 7
8C Interference structure on part 8
9 Lower support member
10 U-rod
10A U-rod arm
10B U-rod arm
11 Pad mount
12 Pad
13 Central connecting rod
14, 47 Interface between parts 4 and 7
21 Central rod apertures
25 Movement arrows for U-rod with respect to juncture 100
30 Movement arrows for juncture 100 with respect to lower support member 9
34 Interface between parts 3 and 4
40 Movement arrows for rotation of pad mount 11 and pad 12 on U-rod 10
47, 14 Interface between parts 4 and 7
56 Interface between parts 5 and 6
78 Interface between parts 7 and 8
85 Interface between parts 8 and 5
100 Adjustable juncture
200 Backrest/headrest
300 Lower support

We claim:

1. A motorcycle backrest, comprising:
an upper support member extending from and connected to a motorcycle backrest;
a lower support member extending from and connected to a motorcycle seat;
a juncture intermediate and connecting said support member and said lower support member;
wherein said juncture includes a series of parts connected by a threaded rod with a hand knob at each end of said threaded rod, either or both of which said hand knobs can be rotated in a direction around said rod to compress said series of parts and can be rotated in an opposite direction to decompress said series of parts;
wherein said series of parts are arranged such that they contact and sandwich the upper support member and the lower support member between them so that when the at least one knob is used to compress said series of parts the junction, upper support member, and lower support member are locked into position with respect to each other and when said at least one knob is used to decompress said series of parts the juncture can easily slide up and down on the lower support member thereby changing the elevation of the backrest with respect to said seat, the upper support member can slide up and down with respect to said juncture thereby changing the elevation of the backrest with respect to said seat, and said upper support member can be pivoted around said juncture to change the angle between said backrest and seat;
wherein the upper support member is formed by an inverted "U" shaped rod such that the two linear arms defined by said "U" intersect with said juncture and are sandwiched by said series of parts, and the backrest is connected to a linear horizontal portion of said inverted "U" connecting said two arms, and is rotatable around said horizontal portion.

2. The apparatus of claim 1, wherein said series of parts includes a pair of lower support member gripping parts, and a pair of upper support member gripping parts.

3. The apparatus of claim 2, wherein the lower support member is bar shaped and fits between the two linear arms of said upper support member.

4. The apparatus of claim 3, further including interference structures on surfaces of upper support member gripping parts adjacent lower support member gripping parts, which structures interface with interference structures on adjacent lower support member gripping parts when said hand knobs are tightened so as to assist in locking said members into position.

5. The apparatus of claim 2, further including interference structures on surfaces of upper support member gripping parts adjacent lower support member gripping parts, which structures interface with interference structures on adjacent lower support member gripping parts when said hand knobs are tightened so as to assist in locking said members into position.

6. The apparatus of claim 2, wherein said pair of lower support member gripping parts include indented lower support member portions adapted to enclose and tightly fit around said lower support member so as to provide a frictional lock on said member when compressed, and wherein said pair of upper support member gripping parts include indented upper support member portions adapted to enclose and tightly fit around said lower support member so as to provide a frictional lock on said member when compressed.

7. The apparatus of claim 6, wherein the lower support member is bar shaped and fits between the two linear arms of said upper support member and said pairs of upper support member gripping parts include indented upper support member portions adapted to enclose and tightly fit around said lower support member so as to provide a frictional lock on said member when compressed.

8. The apparatus of claim 7, further including interference structures on surfaces of upper support member gripping parts adjacent lower support member gripping parts, which structures interface with interference structures on adjacent lower support member gripping parts when said hand knobs are tightened so as to assist in locking said members into position.

9. The apparatus of claim 6, further including interference structures on surfaces of upper support member gripping parts adjacent lower support member gripping parts, which structures interface with interference structures on adjacent lower support member gripping parts when said hand knobs are tightened so as to assist in locking said members into position.

10. The apparatus of claim 1, wherein the lower support member is bar shaped and fits between the two linear arms of said upper support member.

11. The apparatus of claim 10, further including interference structures on surfaces of upper support member gripping parts adjacent lower support member gripping parts, which structures interface with interference structures on adjacent lower support member gripping parts when said hand knobs are tightened so as to assist in locking said members into position.

12. A motorcycle backrest, comprising:
an upper support member formed from an inverted "U" shaped member, where said shape defines two arms and a central portion of said "U" connecting arms, which central portion is connected to a backrest, and which arms interface with a juncture;

a lower support member extending from and connected to a seat, which lower support member interfaces with said juncture between said two arms;

wherein said juncture includes a series of parts connected by a threaded rod with at least one knob at an end of said threaded rod that can be rotated in one direction around said rod to compress said series of parts and can rotated in an opposite direction to decompress said series of parts; and wherein said series of parts are arranged such that they contact and sandwich the two arms of the upper support member and the lower support member between them so that when the at least one knob is used to compress said series of parts the junction, upper support member, and lower support member are locked into position with respect to each other and when said at least one knob is used to decompress said series of parts the juncture can easily slide up and down on the lower support member thereby changing the elevation of the backrest with respect to said seat, the upper support member arms can slide up and down with respect to said juncture thereby changing the elevation of the backrest with respect to said seat, and said upper support member arms can be pivoted around said juncture to change the angle between said backrest and seat.

13. The apparatus of claim 12, wherein said series of parts includes at least one of: a pair of lower support member gripping parts, and a pair of upper support member arm gripping parts for each of said arms.

14. The apparatus of claim 13, further including interference structures on surfaces of upper support member gripping parts adjacent lower support member gripping parts, which structures interface with interference structures on adjacent lower support member gripping parts when said hand knobs are tightened so as to assist in locking said members into position.

15. The apparatus of claim 13, wherein any said pair of lower support member gripping parts include indented lower support member portions adapted to enclose and tightly fit around said lower support member so as to provide a frictional lock on said member when compressed, and wherein any said pair of upper support member gripping parts include indented upper support member arm portions adapted to enclose and tightly fit around said lower support member arms so as to provide a frictional lock on said arms when compressed.

16. The apparatus of claim 15, further including interference structures on surfaces of upper support member gripping parts adjacent lower support member gripping parts, which structures interface with interference structures on adjacent lower support member gripping parts when said hand knobs are tightened so as to assist in locking said members into position.

17. The apparatus of claim 12, further including interference structures on surfaces of upper support member gripping parts adjacent lower support member gripping parts, which structures interface with interference structures on adjacent lower support member gripping parts when said hand knobs are tightened so as to assist in locking said members into position.

18. The apparatus of claim 1, further including interference structures on surfaces of upper support member gripping parts adjacent lower support member gripping parts, which structures interface with interference structures on adjacent lower support member gripping parts when said hand knobs are tightened so as to assist in locking said members into position.

\* \* \* \* \*